United States Patent

Ostrom

[15] 3,639,942
[45] Feb. 8, 1972

[54] CASTER BRACKET ASSEMBLY

[72] Inventor: Martin E. Ostrom, Rockford, Ill.
[73] Assignee: Keystone Consolidated Industries, Inc., Peoria, Ill.
[22] Filed: Dec. 22, 1969
[21] Appl. No.: 886,959

[52] U.S. Cl. ............................................................16/29
[51] Int. Cl. ................................................B60b 33/00
[58] Field of Search ........................248/188.8; 16/29, 30, 31; 287/20

[56] References Cited

UNITED STATES PATENTS

| | | | |
|---|---|---|---|
| 2,738,539 | 3/1956 | Schultz, Jr. | 16/29 |
| Re 16,133 | 8/1925 | Smithfield | 16/29 |
| 2,700,584 | 1/1955 | Hobbs | 287/20 |
| 874,514 | 12/1907 | Lindow | 287/20 |
| 2,738,540 | 3/1956 | Kramcsak, Jr. | 16/29 |

FOREIGN PATENTS OR APPLICATIONS 787,918  12/1957  Great Britain..............................16/29

Primary Examiner—Bobby R. Gay
Assistant Examiner—Doris L. Troutman
Attorney—Wilson & Geppert

[57] ABSTRACT

A caster bracket assembly to mount a caster onto the interior surface of a furniture base utilizing a one-piece caster bracket having an integral caster socket or a separate caster socket secured thereto. The caster bracket and socket are both formed of the same or similar materials, and the bracket has a pair of legs or flanges with means to fasten the bracket legs to the interior surface of the furniture piece and positioning flanges or tabs engaging the lower edges of the furniture piece.

8 Claims, 18 Drawing Figures

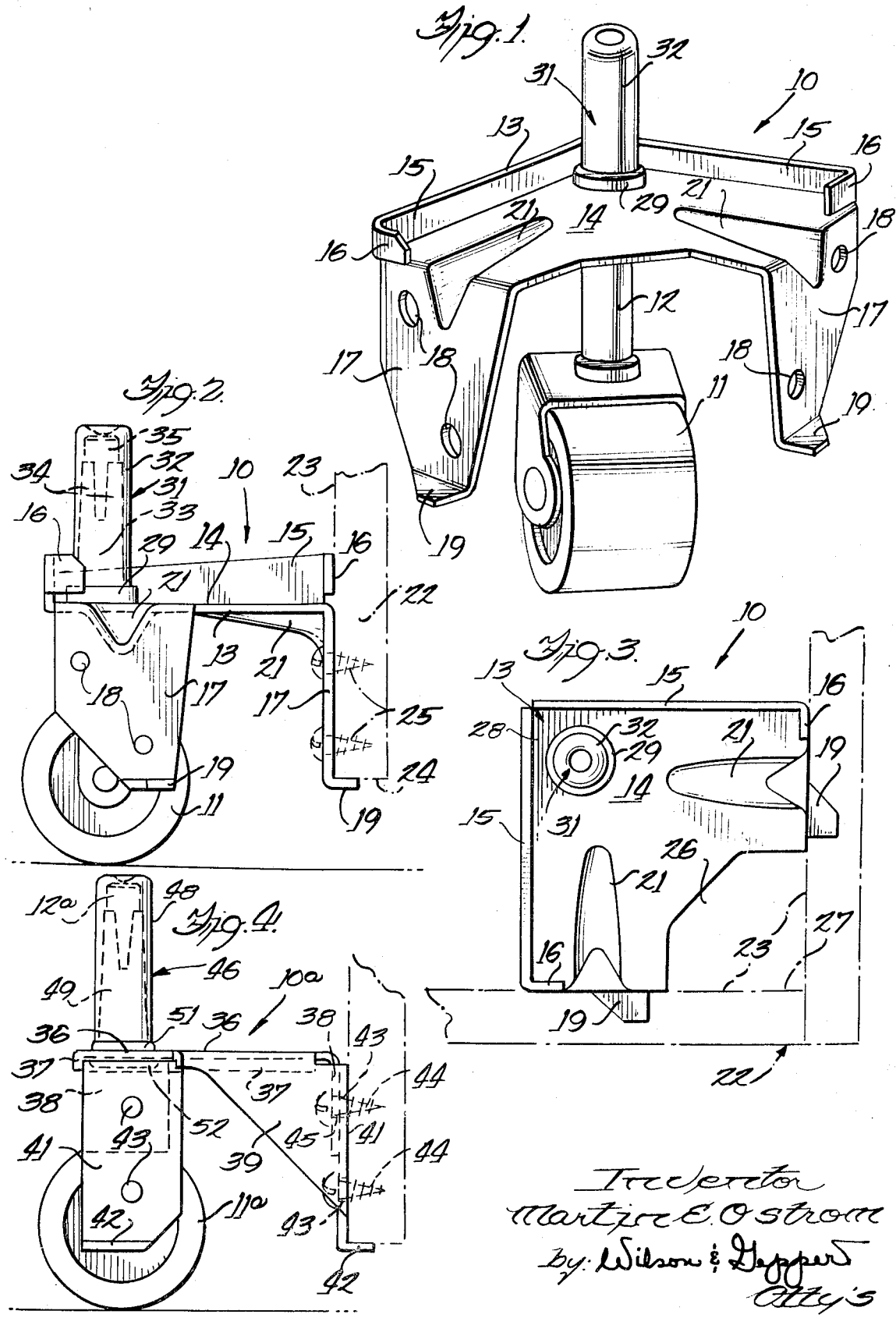

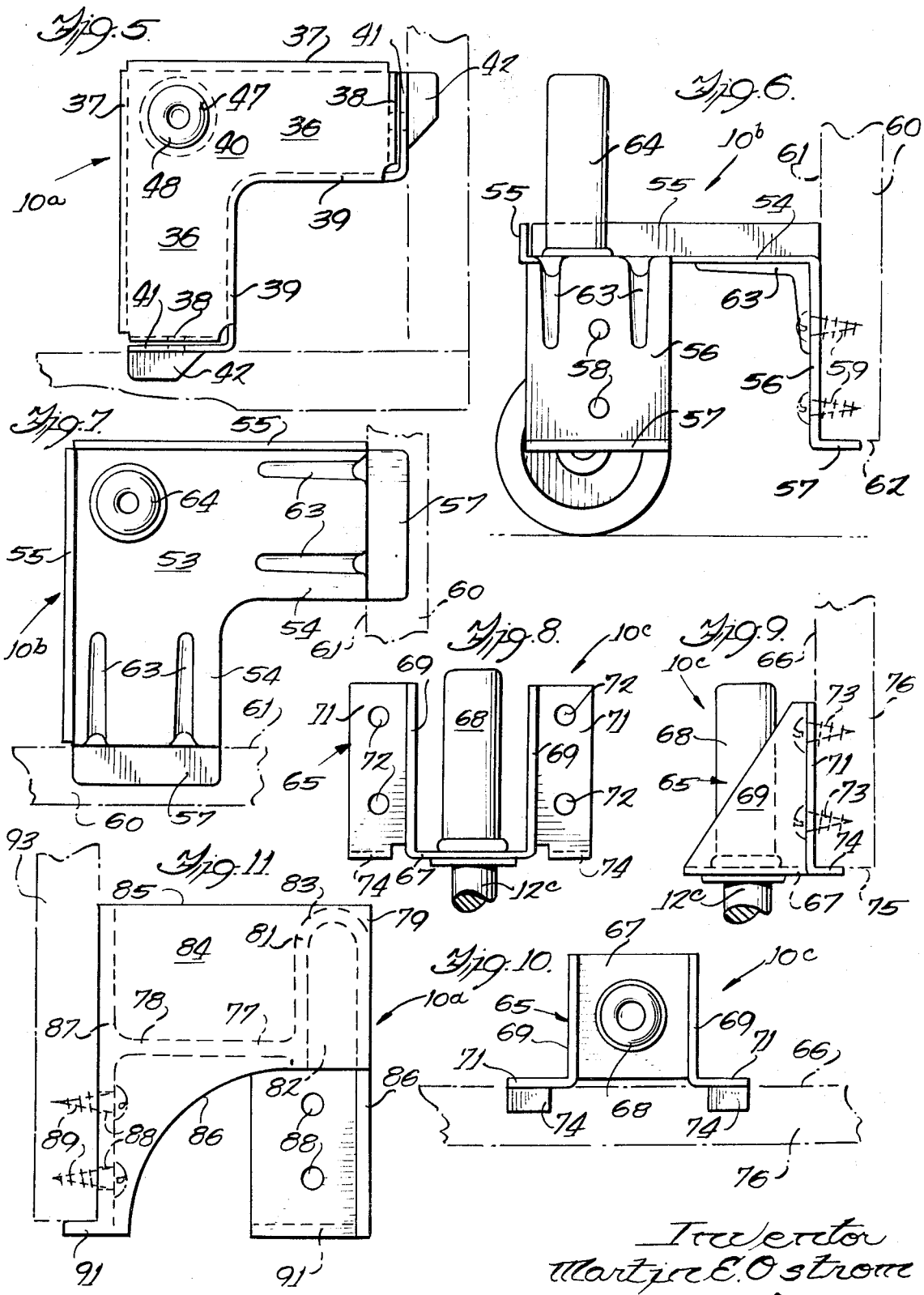

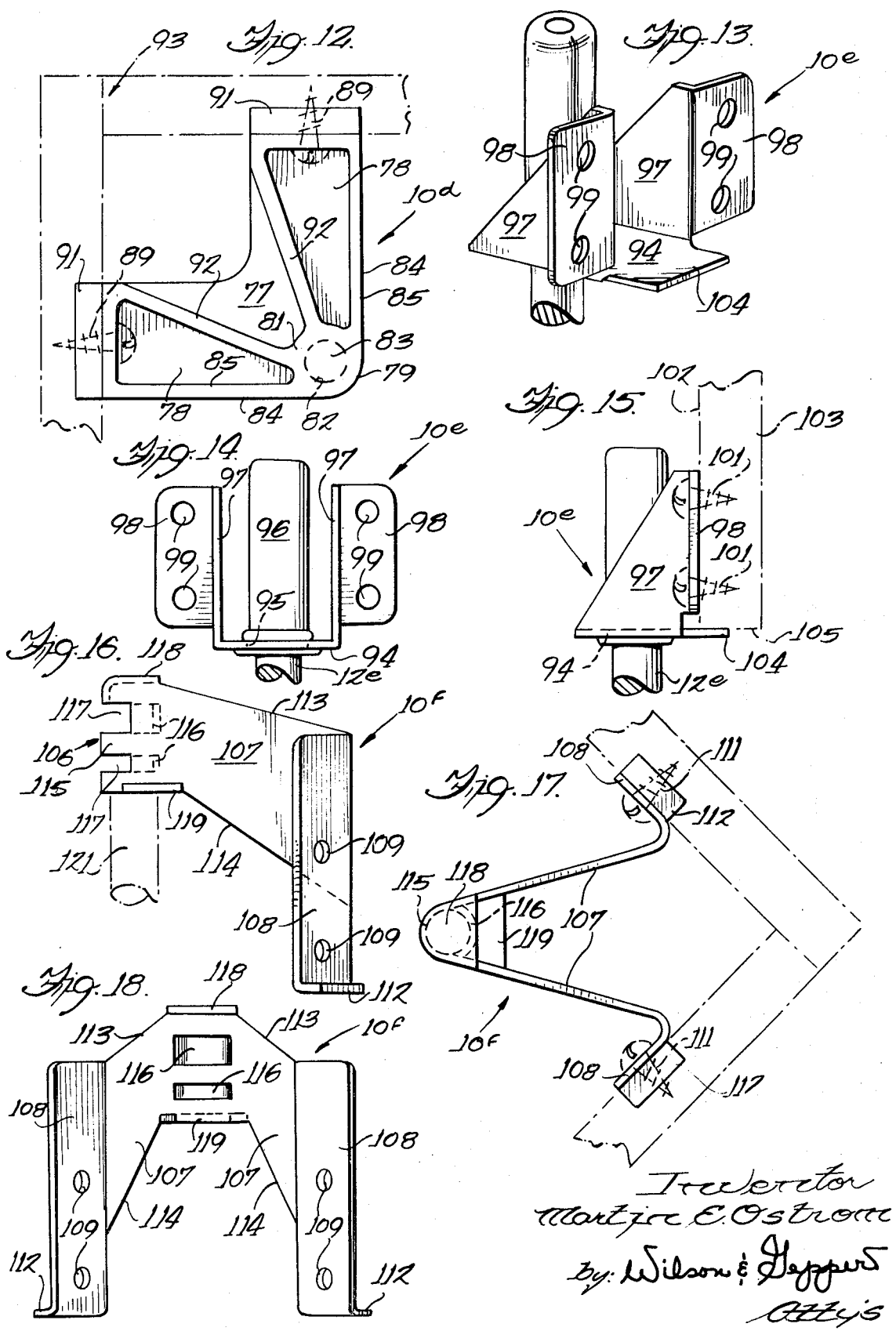

CASTER BRACKET ASSEMBLY

The present invention relates to the mounting of casters upon furniture for mobility, and more particularly to caster bracket assemblies to be secured to a furniture base and receive the stem of a caster.

Among the objects of the present invention is the provision of a caster bracket assembly having a mounting bracket and a caster socket secured thereto. The bracket includes a generally horizontal plate forming a mounting for a caster socket and a pair of generally vertical legs or flanges adapted to be secured to the interior surface of a base for a piece of furniture and having positioning flanges abutting the lower edges of the furniture base.

Another object of the present invention is the provision of a one-piece caster bracket where the caster socket receiving the stem of the caster is integral with or secured to the bracket to be attached to the furniture piece.

A further object of the present invention is the provision of an all-metal caster bracket having a caster socket assembly secured thereto to form a one-piece arrangement where the caster stem is easily and readily secured in the socket and the bracket secured to a furniture piece.

The present invention also comprehends the provision of a one-piece plastic caster bracket and socket assembly formed to receive the stem of the caster and be secured to a furniture piece.

Further objects are to provide a construction of maximum simplicity, efficiency, economy and ease of assembly and such further objects, advantages and capabilities as will late more fully appear and are inherently possessed thereby.

In the drawings:

FIG. 1 is a perspective view of a caster bracket assembly with a suitable caster assembled thereto.

FIG. 2 is a side elevational view of the caster bracket assembly showing its assembly to the base of a furniture piece.

FIG. 3 is a top plan view of the caster bracket assembly.

FIG. 4 is a side elevational view of a second embodiment of caster bracket assembly.

FIG. 5 is a top plan view of the assembly of FIG. 4.

FIG. 6 is a side elevational view of a third embodiment of caster bracket assembly.

FIG. 7 is a top plan view of the bracket assembly of FIG. 6.

FIG. 8 is a front elevational view of a fourth embodiment of a caster bracket assembly.

FIG. 9 is a side elevational view of the bracket of FIG. 8.

FIG. 10 is a top plan view of the bracket of FIG. 8.

FIG. 11 is a side elevational view of another embodiment of caster bracket.

FIG. 12 is a top plan view of the bracket of FIG. 11.

FIG. 13 is a perspective view of a further embodiment of caster bracket assembly.

FIG. 14 is a front elevational view of the assembly of FIG. 13.

FIG. 15 is a side elevational view of the assembly of FIG. 13.

FIG. 16 is a side elevational view of yet another embodiment of caster bracket assembly.

FIG. 17 is a top plan view of the bracket assembly of FIG. 16.

FIG. 18 is a front elevational view of the caster bracket of FIG. 16.

Referring more particularly to the disclosure in the drawings wherein are shown illustrative embodiments of the present invention, FIGS. 1–3 disclose a caster bracket assembly 10 for a caster 11 having a stem 12 to pivotally mount the caster onto a cabinet or piece of furniture. The assembly includes a caster bracket 13 having a generally rectangular horizontal plate 14 formed with upstanding or upturned flanges 15, 15 on two adjacent outer edges thereof, the flanges having inturned locating ends or tabs 16, 16. A pair of downwardly extending spaced mounting legs 17, 17 are formed integral with the plate 14 and at right angles to each other. Each leg has two or more openings 18 for receiving suitable screws or fastening means and terminates in an outwardly projecting positioning flange 19.

The plate 14 is provided with a pair of elongated embossments or depressions 21, 21 one of which extends into each leg 17 to strengthen the bracket under relatively heavy loading. As seen in FIGS. 2 and 3, the legs 17, 17 abut against the interior surface 23 of a furniture base 22 with the positioning tabs or flanges 19, 19 abutting the lower edge 24 of the base and screws 25 extend through the openings 18 into the furniture base 22. Also, as seen in FIG. 3, the plate 14 has a cutout 26 at the corner 27 of the furniture base 22. Adjacent the corner 28 opposite the cutout 26 in an annular flange 29 defining an opening to receive an upstanding caster socket 31 secured to the plate 14.

The caster socket 31 includes a top bearing socket 32 with a socket tube 33 secured therein by a suitable clinching operation, and the socket 32 is frictionally held in the openings defined by the flange 29 by the clinching operation. The socket tube 33 is split at the upper end to provide converging portions 34 as is well known in the art to receive and grip the stem 12 of the caster 11, with an enlarged head 35 on the stem 12 being snapped into and retained in the socket tube 33. Thus, the caster 11 mounted in the bracket assembly 10 can be easily and accurately positioned on a furniture base 22 by the locating ends 16, 16 the depending legs 17, 17 and the positioning flanges 19, 19.

FIGS. 4 and 5 disclose a second embodiment of caster bracket assembly $10^a$ having a horizontal plate 40 formed of two arms 36, 36 intersecting at the caster $11^a$, each arm provided with a downturned or depending narrow flange 37 along the outer edge, a depending flange 38 at the outer end, and a triangular depending part 39 integral with the inner edge. A depending mounting leg 41 is formed integral with and bent at right angles to the triangular part 39 to parallel and abut the flange 38. The leg 41 terminates at its lower end in an outward positioning flange 42 and is provided with openings 43 to receive mounting screws or fastening means 44. The flange 38 is also provided with an opening 45 aligned with the upper opening 43 on the leg 41 to receive an upper screw 44.

A caster socket 46 is received in an opening 47 at the intersection of the arms 36, 36 and includes a socket 48 and an internal socket tube 49, both the socket and socket tube provided with an annular bulge 51 to join the two parts and position the aster socket on the plate 40. The lower ends of the socket 48 and the socket tube 49 depend through the opening 47 and are clinched outwardly at 52 to secure the socket onto the bracket $10^a$; the socket tube receiving and retaining the caster stem $12^a$ therein.

FIGS. 6 and 7 disclose a third embodiment of caster bracket assembly $10^b$ having a horizontal plate 53 formed of intersecting arms 54, 54 at right angles; each arm 54 provided with an upturned flange 55 at the outer edge of the plate 53. At the outer ends of the arms 54, 54 are depending mounting legs 56, 56 terminating in inturned locating flanges 57, 57. Each leg 56 has two or more openings 58 to receive screws 59 to secure the bracket $10^b$ onto the interior surface 61 of a furniture base 60 with the flanges 57, 57 abutting the lower edges 62 of the base.

A pair of generally parallel elongated embossments 63, 63 extend into both of the arms 54 and legs 56 to strengthen the bracket. A caster socket 64 is secured in the plate 53 in the same manner and has the same structure as the caster socket shown in FIGS. 4 and 5.

In FIGS. 8, 9 and 10 is shown a fourth embodiment of caster bracket assembly $10^c$ which differs from the first three embodiments in providing a bracket 65 that is secured on the interior surface 66 of only one wall of a furniture base rather than being secured onto a pair of intersecting walls. The bracket 65 has a generally U-shape with a base 67 having an opening receiving the caster socket 68 and a pair of spaced parallel walls 69, 69 extending upwardly at right angles to the base 67. Each wall 69 is provided with a mounting flange 71 at right angles thereto and having openings 72 to receive securing screws 73 and terminating at their lower ends in horizontal locating flanges 74.

The caster socket 68 is constructed and retained in the base 67 in the same manner as the socket of FIGS. 4 and 5, and receives the stem 12ᶜ of a suitable caster. The bracket 68 is positioned on the interior surface 66 of a wall of the furniture base with the locating flanges 74, 74 abutting the lower edge 75 of the wall 76, and the bracket is thus secured by the screws 73.

FIGS. 11 and 12 disclose another embodiment of caster bracket assembly 10ᵈ which is a one-piece assembly formed of a suitable plastic material, such as an acrylonitrile-butadienestyrene resin produced under the trademark CYCOLAC. The assembly is molded as a unit and includes a generally horizontal plate 77 formed of a pair of arms 78, 78 at right angles and intersecting at a rounded corner 79 defining part of the caster socket 81. The socket 81 is integral with the plate 77 and has a generally cylindrical configuration providing a passage or housing 82 closed by a semicircular upper end 83.

A pair of vertical sidewalls 84, 84 intersect at the rounded corner 79 and each has an upper horizontal edge 85 and a curved lower edge 86. A vertical end wall 87 is formed at the outer end of each arm 78 perpendicular to and intersecting both the arms 78 and the adjacent sidewall 84. The curved edge 86 of each sidewall extends from the corner 79 adjacent the horizontal plate 77 to adjacent the lower end of the end wall 87. Each wall 87 includes a pair of openings 88 to receive securing screws 89 and terminates in a locating tab or flange 91.

The assembly is also provided with a pair of vertical strengthening webs 92, 92 which extend from an edge of the end wall 87 spaced from the sidewall 84 to and intersecting the socket 81; the web 92 and sidewall 84 converging from the wall 87 toward the socket 81. A conventional caster having a caster stem provided with a resilient split ring adjacent the upper end of the stem is mounted in the bracket 10ᵈ by the frictional retention of the caster stem within the housing 82 of the caster socket 81. This bracket assembly is mounted in the corner of a furniture base 93 in the same manner as the bracket of FIGS. 1, 4 or 6.

FIGS. 13-15 disclose a further embodiment of caster bracket assembly 10ᵉ similar to the assembly 10ᶜ of FIGS. 8-10, except for the positioning flange. This assembly 10ᵉ includes a bracket having a horizontal plate 94 with a generally central opening 95 to receive a caster socket 96 identical to that shown in FIGS. 8-10. A pair of parallel sides 97, 97 extend upward at right angles to the plate 94; the sides terminating in mounting flanges 98, 98 extending outwardly from and at right angles thereto. The flanges each includes openings 99 to receive screws 101 securing the bracket to the interior surface 102 of a furniture base wall 103. The plate 94 extends beyond the vertical plane of the flanges 98, 98 to form a positioning flange 104 engaging the lower edge 105 of the wall 103. The socket 96 is secured in the plate 94 in the same manner as shown in FIGS. 8-10.

FIGS. 16-18 disclose another embodiment of a caster bracket assembly 10ᶠ provided with a caster socket housing 106, a pair of downwardly angled and diverging arms 107, 107 and a pair of outwardly bent mounting flanges 108, 108 formed at acute angles to the arms 107, 107 as seen in FIG. 17. Each flange 108 has a pair of openings 109 to receive securing screws 111 and terminates in a lower outwardly bent locating tab or flange 112. The upper edge 113 and lower edge 114 of each arm 107 also diverges or inclines from the socket housing 106.

The socket housing 106 includes a rounded outer wall 115 with spaced sections 116, 116 being bent inwardly to form the inner semicircular housing wall sections opposite cutouts 117, 117 in the wall 115. A top wall 118 extends across the arms 107, 107 to close the upper end of the socket housing 106, and a spaced parallel bridging wall 119 extends across the arms 107, 107 to aid in defining the lower end of the housing 106. The housing 106 receives and frictionally retains a suitable caster socket 121 that, in turn, will receive the stem of a caster. The configuration of the arms 107, 107 when mounted on the interior surfaces of intersecting furniture base walls at the lower edge will position the caster so as to conceal all but the lower portion of the caster wheel from view from the exterior of the furniture base.

The caster bracket assemblies provide a sufficiently strong structure in view of the various legs and flanges and the embossments thereon to easily support a substantial weight of a furniture base for a wood cabinet of a floor model television of small sofas, chairs or other cabinets. The assembly and caster are easily located on the interior sidewall or corner of the cabinet or other piece and can be quickly secured thereto without changes in alignment. Also, the assemblies each provides a substantial concealment of the caster in the furniture base with the lower edge of the cabinet or other piece positioned relatively close to the floor. In all of these assemblies, the caster stem is positioned where it can swivel unhindered in all directions.

Having thus disclosed my invention, I claim:

1. A caster bracket assembly adapted to be mounted on the interior surface of a base of a cabinet or like structure where the base has a pair of upright walls intersecting at right angles to each other forming an internal corner space, comprising a caster socket adapted to receive the stem of a caster, and a caster bracket operatively connected to said caster socket and including a horizontal plate carrying said caster socket, a pair of spaced depending mounting flanges extending at right angles to the plate to engage the intersecting interior surfaces of the upright cabinet walls and having openings therein receiving suitable fastening means securing the flanges to the cabinet base, and a locating tab at the lower end of each flange abutting the lower edge of an upright wall, said plate being generally rectangular with the corner adjacent the cabinet internal corner being cut away.

2. A caster bracket assembly as set forth in claim 1, including at least one elongated embossment formed in said plate and intersecting each depending flange, said plate having an opening adjacent the corner opposite the cabinet internal corner defined by an upstanding annular flange, said caster socket being anchored in said opening.

3. A caster bracket assembly as set forth in claim 1, in which said plate is formed of two arms intersecting at right angles in a corner receiving said caster socket, and said mounting flanges are located at the outer ends of said arms, each flange terminating in a locating tab.

4. A caster bracket assembly as se forth in claim 3, in which each arm terminates at its outer end in a depending flange, a depending wall formed on the inner edges of said arms and terminating in said mounting flanges perpendicular to said walls and said arms, said mounting flanges being parallel to said depending flanges.

5. A caster bracket assembly as set forth in claim 4, wherein both said mounting flanges and said depending flanges have aligned openings receiving suitable securing means.

6. A caster bracket assembly as set forth in claim 3, in which said mounting flanges are integral with and depend from the ends of said arms, each arm and flange having a pair of parallel elongated strengthening embossments extending into the arm and flange from the intersection thereof.

7. A caster bracket assembly as set forth in claim 1, in which said caster bracket and said caster socket are integral and formed of a suitable plastic material, and said bracket also includes a pair of sidewalls at right angles to and extending above and below said plate, said walls intersecting and merging into said caster socket, each wall also intersecting a depending mounting flange.

8. A caster bracket assembly as set forth in claim 7, in which said mounting flange and said sidewalls extend above said plate to the height of said caster socket, and a pair of vertical webs formed with each web extending from an edge of said mounting flange above the plate to said caster socket and converging with the adjacent sidewall, the lower edge of each sidewall curving from a point adjacent said plate and said caster socket to a point adjacent the locating tab.